United States Patent Office
3,565,872
Patented Feb. 23, 1971

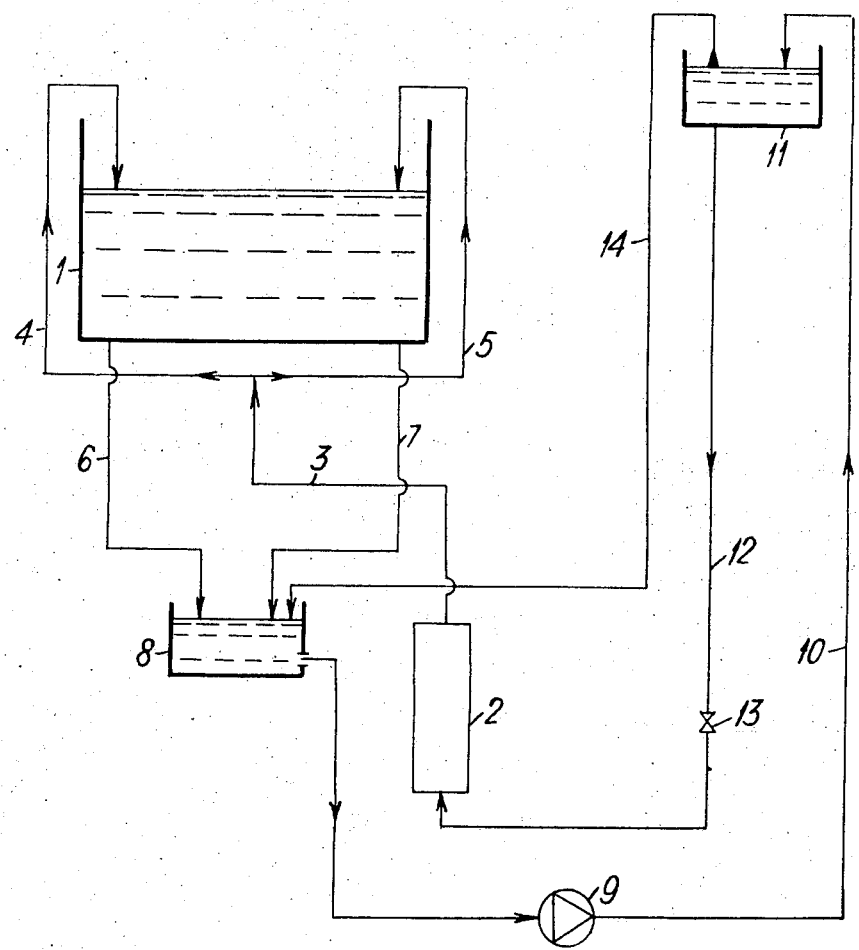

3,565,872
POLYMERIC HALOGEN COMPLEXES, THEIR
PREPARATION AND USE
Ephraim Katchalski, Rehovoth, Israel, and Shmuel Yaroslavsky, deceased, late of Rishon Letzion, Israel, by Carmela Yaroslavsky, Rishon Letzion, Israel, heir and guardian of minor heirs Jacob Yaroslavsky and Hana Yaroslavsky, Ramat Gan, Israel, assignors to YEDA Research and Development Co., Ltd., Rehovoth, Israel, a corporation of Israel
Filed Feb. 20, 1969, Ser. No. 801,931
Claims priority, application Israel, Feb. 27, 1968, 29,540
Int. Cl. C08f 27/02
U.S. Cl. 260—80.72
19 Claims

ABSTRACT OF THE DISCLOSURE

Novel complexes of molecular halogen with cross-linked polymers or copolymers bearing tertiary amino groups. The polymer moiety of the novel complexes is of the fragmentary formula

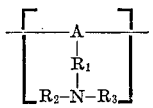

in which A is a recurring portion of the polymer backbone, $R_1$ is an alkylene or arylene radical, and $R_2$ and $R_3$ are each an alkyl, aryl or aralkyl radical or any of the pairs $R_1$, $R_2$; $R_1$, $R_3$; $R_2$, $R_3$ may form together with the nitrogen atom to which they are attached a heterocyclic ring, which may be substituted and/or contain further hetero atoms. The novel complexes have various applications such as maintaining a desired halogen concentration in a certain medium, storage of halogen, controlled delivery of halogen for chemical reactions and the like.

---

The present invention consists in novel complexes of molecular halogen with cross-linked polymers or copolymers bearing tertiary amino groups and having chains of the fragmentary formula

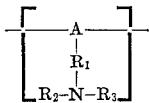   I in which A is a recurring portion of the polymer backbone, $R_1$ is an alkylene or arylene radical, and $R_2$ and $R_3$ are each an alkyl, aryl or aralkyl radical or any of the pairs $R_1$, $R_2$; $R_1$, $R_3$; $R_2$, $R_3$ may form together with the nitrogen atom to which they are attached a heterocyclic ring, which may be substituted and/or contain further hetero atoms.

The constituents of the novel complexes according to the invention are thus elementary halogen on the one hand and cross-linked polymers on the other hand. In the cross-linked polymers, the cross-linking may be of any conventional type such as, for example, divinylbenzene or tri-vinylbenzene bridges.

As is seen from the above Formula I, the polymer moiety of the complexes according to the invention is characterized by a plurality of tertiary amino groups which remain tertiary upon complexation, and it is assumed that these groups are the sites of complexation. In contrast, in known anion-exchanger type resins bearing amino groups, these groups are quaternized into ammonium halide groups and the molecular halogen may then be complexed to the anionic halide.

In the novel complexes, all or only a fraction of the available amino groups may be engaged. Moreover, different amino groups may be engaged by different halogens so as to form complexes in which two or more different halogens are associated with each tertiary amino group of the cross-linked polymer moiety. Also, each tertiary amino group may be engaged by either one single molecule $Hal_2$ or a polymolecular halogen unit $(Hal_2)_n$ where $n$ is a whole number.

Each molecule $Hal_2$ may be homogeneous, e.g. $Cl_2$, $Br_2$, $I_2$, or heterogeneous such as BrI, ClBr, ClI and the like. Also, a polymolecular halogen chain $(Hal_2)_n$ may comprise different homogeneous and/or heterogeneous molecular $Hal_2$ units. The preferred complexes according to the invention are those in which $Hal_2$ is $Cl_2$, $Br_2$, $I_2$, BrI, ClI, ClBr.

The novel complexes according to the invention are characterized, among others, by a high degree of thermal stability, by the fact that they form readily and by well-defined dissociation constants depending mainly on the number of tertiary amino groups in the polymer molecule that are still available for halogen association, on the nature of the amines involved and on the surrounding medium. Consequently, every given complex is in equilibrium with a fixed concentration of gaseous or liquid halogen in the surrounding atmosphere or solution.

In view of their properties, the novel complexes are useful in various fields. For example, a complex according to the invention may evolve a constant or slowly changing amount of pure free halogen to the surrounding gaseous or liquid medium, or take up some halogen therefrom, depending among others, on the concentration of the free halogen in the surrounding medium and the halogen content of the complex. Where the surrounding medium is a liquid solution of elementary halogen, a complex according to the invention may buffer the solution near the dissociation constant of the complex, i.e. the association or dissociation of the complex will be accompanied by relatively small changes in the concentration of halogen in the surrounding solution. The buffering capacity depends, among others, on the type of complexing polymers used and the type of solvent. Use can be made of this property whenever buffering of a halogen level is required without contamination of the halogen by the buffering agent, e.g. for the purpose of disinfection of water reservoirs, such as swimming pools, industrial reservoirs or the like; or for maintaining a substantially constant halogen level in a liquid reaction medium in which halogen is formed in the course of the reaction, and the like.

The new complexes according to the invention may also serve as halogen donors in various halogenation reactions. Quite generally, it has been established in accordance with the invention that the new complexes can be used for carrying out any reaction for which elementary halogen is required. This offers a great advantage since in this way problems arising from the poisonous and corrosive effects of elementary halogen can be avoided.

The novel complexes according to the invention form readily upon contact of a cross-linked polymer corresponding to the fractional Formula I given above with elementary halogen. The formation occurs even where the concentration of the elementary halogen in the surrounding atmosphere or solution, aqueous or organic, is comparatively low. In view of this, polymers of the above fractional Formula I can in accordance with the invention serve as scavengers for the recovery of halogen from liquid or gaseous media. For example, the pKa value of poly-4-vinylpyridine cross linked with 2% by weight of divinylbenzene is below 7.0, therefore, the halogen will remain complexed to the amine in aqueous neutral solution. Indeed, if from 0.5–10 gr. of this polymer is mixed with 100 millilitres of an aqueous bromine solution, e.g. resulting from the treatment of sea water with elementary chlorine and having a pH of from 4-7, bromine is removed from the solution under formation of a complex with the resin. Where the same polymer is mixed with an aqueous halogen solution in equimolecular proportion, i.e. one mole of available tertiary amino group for each mole of elementary halogen, the bulk of the halogen will be removed from the solution, leaving behind a few p.p.m. of residual elementary halogen.

A complex according to the invention may be decomposed to produce elementary halogen or a halide solution. This decomposition can, for example, be effected by washing the complex with a suitable organic solvent, inorganic agent or by reductive treatment, e.g. with a sulfurous reducing agent.

The formation and decomposition of complexes according to the invention may be utilized in novel cyclic processes in which in a first stage elementary halogen is recovered from a reaction mixture in the form of a complex, and in a second stage the elementary halogen is liberated for consumption. The halogen evolved in this manner is free of foreign material, since the carriers are cross-linked and insoluble. Halogen evolution is reversible, i.e. the polymer can be re-charged and its activity regenerated. After several cycles substantially the same capacity of loading is retained. In this respect these resins can be described as "halogen exchange resins." The complex formation can take place, for example, in the course of manufacture of the elementary halogen, or for the recovery of elementary halogen from waste solutions or gases, e.g. industrial flue or exhaust gases. The complexes may also be utilized for the storage and transportation of elementary halogen. This offers great advantages, for example, in the case of bromine which is known to be highly corrosive.

Quite generally, it may be said that the complexes according to the invention are useful for a halogen transfer, i.e. for the storage and transportation of elementary halogen and its subsequent release when and where required. Therefore, in one of its aspects, the invention also consists in a method of effecting halogen transfer comprising the step of contacting a cross-linked resin having chains of the fragmentary Formula I given herein before with elementary halogen to form a complex as defined hereinbefore, and subsequently decomposing the complex to release elementary halogen.

Examples of resins that are applicable for formation of complexes in accordance with the invention are:

Poly-4-vinylpyridine cross-linked with divinylbenzene
Poly-2-vinylpyridine cross-linked with divinylbenzene
Poly-2-methyl-5-vinylpyridine cross-linked with divinylbenzene
Poly-4-vinylquinoline cross-linked with divinylbenzene A polymer resulting from chloromethylation of a copolymer of styrene and divinylbenzene, and reaction of the chloromethylated resin with diethylamine.

The first four of the above resins are prepared by direct copolymerization of the appropriate vinyl monomer with the desired cross-linking agent or agents. A variety of heteropolymers may be prepared by copolymerization of two or more vinyl monomers and a cross-linking agent or two or more cross-linking agents.

The polymer moieties of the novel complexes according to the invention are either known per se or are easily accessible by conventional methods for the preparation of polymers of this kind. The novelty of the invention thus does not reside in the polymeric bases of Formula I but rather in the products of their complexation with halogen, as defined, which have never been described and which possess unexpected and very useful properties.

The annexed drawing is a flow sheet of a recirculating pool disinfected with $Br_2$ by means of a complex according to the invention, as will be described in the following Example 15.

The invention is illustrated by the following examples without being limited thereto. In all examples the percent indications for compositions are by weight unless otherwise stated.

EXAMPLE 1

Poly-4-vinylpyridine cross-linked with 2% divinylbenzene was suspended in an aqueous 1.7% bromine solution in a molar ratio of 1 mole of a recurring

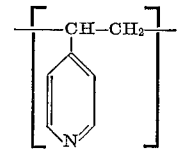

group of the polymer for each 30 moles of bromine, and the suspension was magnetically stirred for 48 hours at room temperature. The bromine loaded polymer, which will be referred to hereinafter for short as $PVP.Br_2$, was filtered off and washed with water. Analysis of the complex showed 66% of $Br_2$ and 6% of $Br^-$.

For comparison, some quaternized cross-linked resins of the ion-exchanger type were submitted to similar treatment and were then analyzed, giving the following results:

TABLE 1

| Polymer | $Br_2$, percent | $Br^-$, percent |
|---|---|---|
| Poly-4-vinylpyridine hydrobromide | 21 | 40 |
| Poly-(4-vinyl-N-butylpyridinium bromide) | 32 | 38 |
| Dowex 1-X2 [1] (in the hydrobromide form) | 31 | 32 |

[1] Trade name, for particulars see Example 5.

By comparing these results with the one for the complex according to the invention, it is noted that whereas in the complex according to the invention the molecular bromine predominates, in the compounds resulting from a similar treatment of anion exchanging resins, the anionic bromine $Br^-$ predominates.

EXAMPLE 2

200 mg. of the same cross-linked polymer used in Example 1 was introduced into a solution of 5 g. of molecular iodine in 150 ml. of carbon tetrachloride. The resulting suspension was magnetically stirred for 24 hours. The iodine-loaded polymer ($PVP.I_2$) was filtered off, washed with carbon tetrachloride and dried. Analysis of the complex showed a total iodine content of 69.8% and a free $I_2$ content of 58.6%.

EXAMPLE 3

The same cross-linked polymer used in Example I was dispersed in a Petri dish and placed in a hermetically sealed desiccator under a Cl atmosphere for 30 hours. Analysis of the chlorine-loaded polymer ($PVP.Cl_2$) showed 6.5% of $Cl_2$, 13.3% of $Cl^-$ and 8.9% of total N.

EXAMPLE 4

300 mg. of the same cross-linked polymer used in Example 1 was suspended in 50 ml. carbon tetrachloride and reacted with 5 g. of commercial iodine bromide (IBr) containing equiponderal amounts of both elements. The suspension was stirred magnetically for 24 hours. The complex (PVP.IBr) was filtered off, washed wih 5 ml. of carbon tetrachloride and dried. Analysis of this complex showed a halogen content of 62% consisting of equiponderal amounts of bromine and iodine.

EXAMPLE 5

1.25 g. of the same cross-linked polymer used in Example 1 was introduced into 50 ml. of a solution of 9.4 g. of molecular bromine and 0.05 mole of KBr in 1 litre of distilled water. After 24 hours the residual bromine in solution was 1 p.p.m.

For comparison, the same amounts of various quaternary strong base anionic exchange resins were submitted to a similar treatment of anion exchanging resin,s the anionic commercially available and their properties and chemical structure are described in U.S. Pat. 3,101,250. Some of the resins used comprise the recurrent unit:

$$-C_6H_4-CH_2N^+(CH_3)_3$$

and are designated as Type A; others comprise the recurrent unit $-C_6H_4-CH_2N^+(CH_3)_2CH_2CH_2OH$ and are designated as Type B. The results of these comparative tests are given in the following Table 2:

TABLE 2

| Resin (trade name) | Type (recurring unit) | Source | Residual bromine in (p.p.m.) After 24 hrs. | After 5 days |
|---|---|---|---|---|
| Dowex 1-X2 | A | Dow Chem. Co., Michigan. | 24 | 16 |
| Dowex 2-X10 | B | do | 28 | |
| AG-1-X4 | A | Bio-Rad Lab., California. | 40 | 16 |
| Amb. IRA-400 | A | Rohm and Haas Co. of Philadelphia, Pa. | 16 | 16 |
| Amb. IRA 410 | B | do | 32 | 16 |
| Duolite A-4 | Phenolic tertiary amine. | Chemical Process Co. of Redwood City, California. | 24 | |
| Duolite A-40 | B | do | 40 | |

By comparing the results in the above table with those obtained with a complex-forming polymer in accordance with the invention, the superiority of the latter as regards the rate of bromine absorption from an aqueous solution is clearly seen.

EXAMPLE 6

1.25 g. of the same cross-linked polymer used in Example 1 was suspended in 50 ml. of a solution of 9.4 g. of molecular bromine and 0.04 mole of KBr in 1 litre of distilled water. One experiment was conducted at 60° C. and another at 100° C. and, for comparison, similar experiments were conducted with Dowex 1-X2 (trade name, see Example 5) which is a commercial anion exchanging resin. The results are given in the following Table 3:

TABLE 3

| Polymer | Temperature, °C. | Residual bromine, p.p.m. |
|---|---|---|
| Cross-linked poly-4-vinylpyridine | 60 | 10 |
| Dowex 1-X2 | 60 | 100 |
| Cross-linked poly-4-vinylpyridine | 100 | Undetectable |
| Dowex 1-X2 | 100 | 47 |

From the comparative data in the above table the superiority of $Br_2$ removal from a solution at elevated temperature through complex formation according to the invention is seen.

EXAMPLE 7

1.25 g. of the polymer used in Example 1 was introduced into a solution of 4.3 g. of molecular bromine in 500 ml. of sea water in 26° C. and the residual bromine was determined after 24 and 120 hours. A similar experiment was conducted with 1.25 g. of the anion exchanger resins Dowex 1-X2 and Dowex 1-X4 (trade name, see Example 5). The results obtained are tabulated in the following Table 4:

TABLE 4

| Polymer | Time, hrs. | Residual bromine, p.p.m. |
|---|---|---|
| Cross-linked poly-4-vinylpyridine | 24 | 32 |
| Do | 120 | 4 |
| Dowex 1-X2 | 24 | 140 |
| | 120 | 80 |
| Dowex 1-X4 | 24 | 240 |
| | 120 | 129 |

Again the superiority of the complex formation in accordance with the invention as compared to the removal of bromine from an aqueous solution by means of resins of the anionic exchanger type is demonstrated. Moreover, these experiments show the efficient complexation of bromine in accordance with the invention in a saline solution which demonstrates the possibility to employ the complexation according to the invention in the course of bromine production from saline solutions, e.g. sea water or Dead Sea brines.

EXAMPLE 8

To one litre of original Dead Sea brine, 9 g. of molecular bromine was added. 50 ml. of the above solution was reacted batchwise with 1.25 g. cross-linked poly-4-vinylpyridine at 26° C. For comparison the same experiment was carried out using 1.25 g. Dowex 1-X2 (trade name, see Example 5). The results are summarized in the following Table 5:

TABLE 5

| Polymer | Time, hrs. | Residual bromine, p.p.m. |
|---|---|---|
| Cross-linked poly-4-vinylpyridine | 1 | 10 |
| Do | 48 | 1 |
| Dowex 1-X2 | 1 | 80 |
| Dowex 1-X2 | 48 | 16 |

EXAMPLE 9

A sample of 3 g. poly-4-vinylpyridine cross-linked with 2% divinylbenzene was placed in a glass column of 3.0 cm. I.D. and a 7% aqueous KBr solution containing (1.7%) of $Br_2$ was passed slowly through the column. After the passage of 200 ml., a sample was taken out for analysis of free bromine and total nitrogen. From the molar ratio of both elements the degree of adsorption was calculated. The adsorbed bromine was then removed in different experiments, using 20% KOH, organic solvents and a 5% sodium bisulfite solution. The free resin was then again analyzed for total nitrogen (Dumas) and total bromine after combustion (Shoniger). This procedure of loading and unloading of the resin was repeated an additional four times and the results are presented in the following Table 6:

TABLE 6

| Run No. | Bromine adsorption,[1] percent | Analysis of resin after desorption [2] N. percent | Br. percent | Removal of bromine by— |
|---|---|---|---|---|
| 1 | 100 | 92 | 0.6 | 4 N KOH, ethanol. |
| 2 | 105 | 95 | 0.6 | 4 N KOH, methanol. |
| 3 | 95 | 90 | 0.6 | 4 N KOH, acetone DMF. |
| 4 | 106 | 70 | 0.1 | $NaHSO_3$ 5% in $H_2O$. |
| 5 | 92 | 76 | 1.8 | $NaHSO_3$ 5% in $H_2O$. |

[1] Calculated from ratios of determined free bromine to total nitrogen (Dumas).
[2] N-content of original resin taken as 100% and bromine content in original resin as 0.0%.

As seen from the results the capacity of the resin to adsorb and desorb molecular bromine is not appreciably affected after 5 cycles.

EXAMPLE 10

(A) A copolymer of styrene and 2% divinylbenzene was chloromethylated according to the Merrifield procedure [R. B. Merrifield, J. Am. Chem. Soc., 85, 2149 (1963)] to the extent of 5.14% of chlorine. The resin was heated for 18 hours at 50° C. in 100 cc. of diethylamine. The mixture was filtered and the resin was washed with water, a 1 N sodium hydroxide solution, water, methanol and ether, and then dried. Analysis of the dry resin showed 1.71% of nitrogen and no chlorine.

(B) 0.23 g. of the above tertiary amine resin was added to 100 ml. of an aqueous solution of 0.5 g. of bromine and 0.9 g. of potassium bromide, and the mixture was stirred for 1.5 hours. The polymer was filtered off, washed and dried. Analysis showed 17% of free bromine, corresponding to saturation of all the nitrogen atoms, each with one molecule of bromine.

(C) 0.1123 g. of the above bromide-laden resin was stirred in 25 ml. of distilled water containing 0.025 g. of potassium bromine. After 20 hours the mixture was filtered and the filtrate analyzed for free bromine and found to contain about 2 p.p.m. of free bromine.

EXAMPLE 11

To a solution of 0.02% of iodine (200 p.p.m.) in 50 ml. of water there was added 100 mg. of the same polymer that was used in Example 1. After 5 hours the solution contained less than 1 p.p.m. of residual iodine.

EXAMPLE 12

For association measurements, samples of 75 mg., 120 mg., 180 mg., 240 mg., 300 mg., and 360 mg. of the same polymer as used in Example 1 were mixed with 250 ml. of 0.02 M $KBr_3$ (potassium perbromide) solution. The reaction was carried out in 250 ml. centrifuge tubes fitted with a ball joint. The stop-cock was greased with fluorinated hydrocarbon and held in place during the reaction by a clamp. The unbound bromine was determined in 10 ml. samples taken out after centrifugation and after various time intervals until equilibrium was reached. Concentration of free bromine was down to 2 p.p.m. $Br_2$ was determined iodometrically. Concentrations of free bromine were between 0.2–2 p.p.m. $Br_2$ was determined amperometrically.

The experiments of dissociation were performed in the same vessels. The samples of brominated cross-linked poly-4-vinylpyridine were introduced from the adsorption experiments to each vessel and 250 ml. of 0.02 molar KBr was added. Dissociated molecular bromine was measured after various time intervals until equilibrium was reached.

The experiments were performed at pH=3 and pH=5.4 (acetate buffer) in order to obtain kinetic information for both the protonated and unprotonated polymer, whose pK was found to be 4.4. The percent of adsorbed bromine was determined after equilibration by analyzing the complex for total nitrogen and free $Br_2$. From the treatment of data according to Sipp's equation, the following mean dissociation constants K were obtained:

$K = 1.4 \times 10^{-5}$ mole/litre at pH=3.0
$K = 3.1 \times 10^{-5}$ mole/litre at pH=5.4

The above results demonstrate clearly the readiness of complexation of bromine and cross-linked poly-4-vinylpyridine to form a complex according to the invention in an acidic aqueous medium. They show, in other words, that the complexation in accordance with the invention can be utilized in the production of bromine.

EXAMPLE 13

0.36 g. of poly-4-vinylpyridine cross-linked with 2% of divinylbenzene loaded by complexation with bromine corresponding to 1.2 mmole of $Br_2$ was mixed with 0.088 g. (0.5 mmole) of cis-stilbene in 10 ml. of chloroform, and the mixture was heated for 2 hours at 50° C. The polymer was then filtered off and washed with ether. The chloroform and ether filtrates were combined and the solvents evaporated, to yield 0.12 g. of a solid (70% of the theory) which began to melt at 90° C. Fractional recrystallization from ethanol yielded meso- and D,L-dibromostilbene in a 1:1 ratio, melting at 235° C. and 111° C., respectively.

EXAMPLE 14

A solution of 0.72 mmole of potassium iodide in 500 ml. of distilled water was mixed with 0.963 mmole of a complex of PVP·$Br_2$ and with 5.04 mmole of the non-complexed poly-4-vinylpyridine cross-linked with 2% of divinylbenzene. The mixture was stirred for 3 hours at 25° C. and thereafter filtered. The complex PVP·$Br_2$ released molecular bromine to oxidize the iodide into iodine, and the latter was complexed by the free cross-linked poly-4-vinylpyridine. No iodide or free iodine were found in the filtrate.

EXAMPLE 15

A model of a recirculating pool with four inlets was constructed and is diagrammatically illustrated in the annexed drawing. As shown in the drawing, a circular pool 1 is fed with water arriving through a column 2 packed with PVP·$Br_2$ so that the throughgoing water takes up some free bromine. The water discharged from column 2 flows through line 3 and is fed through lines 4, 5 into pool 1. Spent water is discharged from pool 1 through lines 6, 7 into a sump 8 of a pump 9 and is pumped by the latter into a constant level tank 11 from where it is returned through a line 12 comprising a control valve 13, to column 2. Any excess water is discharged from tank 11 by overflow through a line 14 into sump 8.

The volume of water in pool 1 was regulated to 50 l., while the water in the pump sump 8, column 2, tank 11 and the tubing amounted to 4 l. Column 2 measured 24.4 cm. in length and 2.5 cm. in diameter. The rate of flow was regulated so as to provide one circulation of the full pool volume in 8 hours. The inlets were disposed in such a manner that the inflowing water caused a slight rotation of the pool water and thereby an optimal distribution.

Experiments were carried out at 20° and the temperature was controlled by a thermostated heating element and stirring. Various experiments were run with different samples of PVP·$Br_2$ in which the degrees of bromine complexation were 25%, 50% and 100% of the saturation value. For comparison, disinfection of tap water under the same conditions was also performed with liquid $Br_2$ introduced dropwise into pool 1. The results are tabulated in the following Table 7 in which the percentage figures indicate the degree of complexation as compared to the 100% sautration value.

TABLE 7

| Bromine source | Weight of source, mg. | Time, hrs. | Residual bromine in solution, p.p.m. |
|---|---|---|---|
| 25% PVP·$Br_2$ | 2,000 | 12 | 1.3 |
| 50% PVP·$Br_2$ | 2,000 | 12 | 3.0 |
| 100% PVP·$Br_2$ | 500 | 12 | 1.2 |
| 100% PVP·$Br_2$ | 500 | 24 | 0.6 |
| 100% PVP·$Br_2$ | 500 | 36 | 0.28 |
| Liquid bromine | (¹) | 12 | 0.8 |
| Do | (¹) | 24 | 0.0 |

¹ 2 p.p.m. at the start.

It is seen from the above table that when liquid bromine was used, the bromine was used up after 24 hours, whereas with 100% PVP·$Br_2$ there remained an effective amount of $Br_2$ in the water even after 36 hours.

During the extended test period with the PVP·$Br_2$ column a very strong killing effect of bacteria (coli) at densities of 5000/199 ml. was observed.

EXAMPLE 16

5-vinyl-2-methyl-pyridine redistilled (10 g.), divinylbenzene 55% in diethylbenzene (0.8 g., redistilled), and 30 ml. benzene were refluxed for two hours. The mixture was cooled to 70° C. and azo-bis-isobutyronitril (0.05 g.) was added. The sample was magnetically stirred for 20 hours at 70° C. The solution became viscous with time, precipitated by addition of ether. This mass was later pulverised in a blender using ether as a solvent. After filtration and drying, separation of different sizes of meshing was performed.

Poly(5-vinyl-2-methyl-pyridine) cross-linked with 4% of divinylbenzene was suspended in an aqueous 1.7% bromine solution in a molar ratio of 1 mole of a recurring group of the polymer for each 30 moles of bromine. The suspension was magnetically stirred for 24 hours at room temperature. The brominated polymer was filtered off and washed with water. Analysis of the complex by extraction showed 51.4% of free bromine, and by combustion 51.8% of total bromine, which showed that all the bromine present was $Br_2$.

EXAMPLE 17

5-vinyl-2-methyl-pyridine redistilled (5 g.), 4-vinyl-pyridine (5 g., redistilled), divinylbenzene 55% in diethylbenzene (0.8 g., redistilled) and 30 ml. of benzene were refluxed for two hours. The preparation of the copolymer was followed up as described in Example 16.

Reaction with aqueous bromine was performed as described for the homopolymer in Example 16. Analysis of the complex of copolymer with molecular bromine showed 61.4% of free bromine and by combustion 63.0% of total bromine, showing that nearly all the bromine present was in the form of $Br_2$.

What is claimed is:

1. A novel complex of molecular halogen with cross-linked insoluble polymers bearing tertiary amino groups and having chains of the fragmentary formula

in which A is a recurring unit of a polymer backbone resulting from the polymerization of at least one kind of vinylic monomer and B is a member selected from a group consisting of (a) dependent tertiary amino groups linked to the backbone through a link which is a member selected from the group consisting of alkylene and arylene radicals, and (b) heterocyclic radicals constituting one endocyclic tertiary amino group and linked to the backbone through an endocyclic carbon atom, said chains consisting of C, H and N atoms.

2. A complex according to claim 1, wherein all available amino groups are engaged by molecular halogen (saturated complex).

3. A complex according to claim 1, wherein only a fraction of the available amino groups is engaged by molecular halogen (unsaturated complex).

4. A process for the preparation of a complex according to claim 1, comprising contacting a polymer of the fragmentary formula in claim 1, with elementary halogen.

5. A process for the preparation of a complex according to claim 1, comprising contacting an unsaturated complex according to claim 3, with elementary halogen.

6. Method of maintaining a desired concentration of molecular halogen in a liquid medium, comprising contacting said medium with a complex according to claim 1.

7. Method according to claim 6, wherein the water in a recirculating swimming pool is disinfected by contacting it with a bromo-complex according to claim 1.

8. Method according to claim 7, wherein said complex is packed in a column located in the path of the circulating water.

9. Method according to claim 6, applied to maintaining a desired halogen concentration in the course of a chemical reaction.

10. Method according to claim 9, wherein an unsaturated complex according to claim 3 is used capable of taking up from the reaction mixture excessive halogen.

11. Method of effecting halogen transfer comprising the step of contacting a cross-linked resin having chains of the fragmentary Formula I in claim 1, with elementary halogen to form a complex as defined in claim 1 and subsequently decomposing the complex to release elementary halogen.

12. Method according to claim 11, applied to the manufacturing of elementary halogen, wherein a cross-linked polymer of the fragmentary Formula I in claim 1 or an unsaturated complex according to claim 3, is contacted with an aqueous solution of elementary halogen, the resulting complex is withdrawn from the solution and is decomposed to liberate free halogen where and when required.

13. Method according to claim 12, wherein said aqueous solution of elementary halogen is produced by oxidation from a corresponding halide solution.

14. A method for the recovery of elementary iodine from an aqueous iodide solution, comprising contacting the iodide solution with a bromo-complex according to claim 1, recovering an iodo-complex from the solution and decomposing the latter when and where required.

15. A method for the storage and transportation of elementary halogen, comprising forming a complex according to claim 1, storing and transporting said complex and decomposing it when and where required.

16. Method of effecting chemical reactions in which elementary halogen is consumed, comprising introducing into the reaction mixture a complex according to claim 1.

17. A novel complex according to claim 1, wherein B is a heterocyclic radical of aromatic character.

18. A complex according to claim 1, wherein B is a saturated heterocyclic radical and the cyclic nitrogen atom is substituted by a hydrocarbyl radical being a member selected from the group of alkyl, aryl and aralkyl radicals.

19. A complex according to claim 1, wherein B is a non-cyclic dependent tertiary amino group linked to the backbone through an arylene radical.

References Cited
UNITED STATES PATENTS

| | | | |
|---|---|---|---|
| 2,540,984 | 2/1951 | Jackson | 260—88.1 |
| 2,739,948 | 3/1956 | D'Alelio | 260—2.1 |
| 3,101,250 | 8/1963 | Schoenbeck | 23—87 |
| 3,437,647 | 4/1969 | Freifeld | 260—88.3 |

JAMES A. SEIDLECK, Primary Examiner

S. M. LEVIN, Assistant Examiner

U.S. Cl. X.R.

260—88.1, 88.2, 88.3